US012757265B2

(12) United States Patent
Jia et al.

(10) Patent No.: US 12,757,265 B2
(45) Date of Patent: Oct. 6, 2026

(54) CONFIGURING AP WITH MBSSID AND MLO ENABLED

(71) Applicant: HEWLETT PACKARD ENTERPRISE DEVELOPMENT LP, Spring, TX (US)

(72) Inventors: Xuguang Jia, Beijing (CN); Xiaoyang Fu, Beijing (CN); Zhen Zhong, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 312 days.

(21) Appl. No.: 18/428,684

(22) Filed: Jan. 31, 2024

(65) Prior Publication Data

US 2025/0247902 A1 Jul. 31, 2025

(51) Int. Cl.

*H04W 76/11* (2018.01)
*H04W 48/16* (2009.01)
*H04W 76/15* (2018.01)

(52) U.S. Cl.

CPC ............ *H04W 76/11* (2018.02); *H04W 48/16* (2013.01); *H04W 76/15* (2018.02)

(58) Field of Classification Search

CPC ..... H04W 76/11; H04W 48/16; H04W 76/15; H04W 24/02; H04L 41/0895

See application file for complete search history.

(56) References Cited

U.S. PATENT DOCUMENTS

| | | | | |
|---|---|---|---|---|
| 2021/0337613 A1* | 10/2021 | Seok | ..................... | H04W 76/15 |
| 2023/0262585 A1* | 8/2023 | Naik | ..................... | H04W 48/08 370/329 |
| 2023/0292215 A1* | 9/2023 | Gan | ..................... | H04W 48/08 |
| 2025/0168753 A1* | 5/2025 | Chirreddy | ............ | H04W 48/20 |

* cited by examiner

*Primary Examiner* — Yemane Mesfin
*Assistant Examiner* — Salma Ayad
(74) *Attorney, Agent, or Firm* — Hewlett Packard Enterprise Patent Department

(57) ABSTRACT

A method for configuring an AP with MLO and MBSSID enabled is provided. The method comprises determining a first MBSSID set on a first link of an AP, and the first MBSSID set comprises a first virtual AP belonging to a first AP MLD of a plurality of AP MLDs. The method further comprises determining a second MBSSID set on a second link of the AP, the second MBSSID set comprises a second virtual AP belonging to a second AP MLD, and the first MBSSID set and the second MBSSID set have virtual APs belonging to a same AP MLD. The method further comprises determining the first virtual AP as a TX VAP of the first MBSSID set. In addition, the method further comprises determining the second virtual AP as a TX VAP of the second MBSSID set. In this way, the stability of the network can be improved.

18 Claims, 11 Drawing Sheets

CONFIGURING AP WITH MBSSID AND MLO ENABLED

BACKGROUND

In the Wi-Fi network, a Multiple Basic Service Set Identifier (MBSSID) refers to a feature that allows a single access point (AP) to support multiple virtual APs (VAPs) within a same physical AP hardware. Each VAP is associated with a unique Basic Service Set Identifier (BSSID) and typically corresponds to a separate network or SSID (Service Set Identifier). A MBSSID transmitted (TX) VAP may broadcast multiple BSSIDs (non-TX BSSID) by using one beacon/probe response frame instead of multiple beacon frames or probe response frames.

Multi-link operation (MLO) is a Wi-Fi technology that enables devices connected to an AP to simultaneously send and/or receive data across different frequency bands and channels. MLO technology is one of the core features added in Wi-Fi 7 that helps enhance the user experience by handling wireless connections more efficiently.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with reference to the following figures.

DETAILED DESCRIPTION

With the emergence of Wi-Fi 7, APs may support both functionalities of MLO and MBSSID. In an AP device with both MLO and MBSSID enabled, the AP may comprise a plurality of VAPs, and the plurality of virtual APs are organized in two dimensions, MBSSID set and AP multiple-link device (MLD). Each MBSSID set comprises one TX VAP and one or more non-TX VAP. According to the protocol, a beacon frame of a TX VAP in a MBSSID set may carry information of all VAPs, including the TX VAP and non-TX VAPs, in this MBSSID set. In addition, a beacon frame of a VAP in an AP MLD may also carry information of all VAPs belonging to this AP MLD on multiple links. Therefore, the TX VAPs on the multiple links may carry information of all VAPs in multiple MBSSID sets that have VAPs on a same AP MLD.

In traditional schemes, a VAP belonging to an AP MLD may be selected as a TX VAP of a MBSSID set. However, if this TX AP is up/down or if the configuration changes, all non-TX VAPs in this MBSSID may also be unable to function for a while, which may cause potential issues with client connections.

Therefore, the implementations of the present disclosure provide a scheme for configuring an AP with MLO and MBSSID enabled. The scheme of the present invention may determine a first MBSSID set on a first link of the AP and a second MBSSID set on a second link of the AP, where the first MBSSID set and the second MBSSID set have virtual APs belonging to a same AP MLD. Then the scheme may select a first VAP belonging to a first AP MLD as a TX VAP of the first MBSSID set, and may select a second VAP belonging to a second AP MLD, which is different from the first AP MLD, as a TX VAP of the second MBSSID set.

In this manner, if the first VAP is down, other VAPs in the first MBSSID set can keep working because a beacon frame of the second VAP may comprise information of all VAPs in the first MBSSID set and the second MBSSID set. In addition, if the first AP MLD is down, the second VAP may continuously transmit beacon frames containing information of all VAPs in the first MBSSID set and the second MBSSID set. Therefore, the stability of the AP device can be improved.

Figure 1:
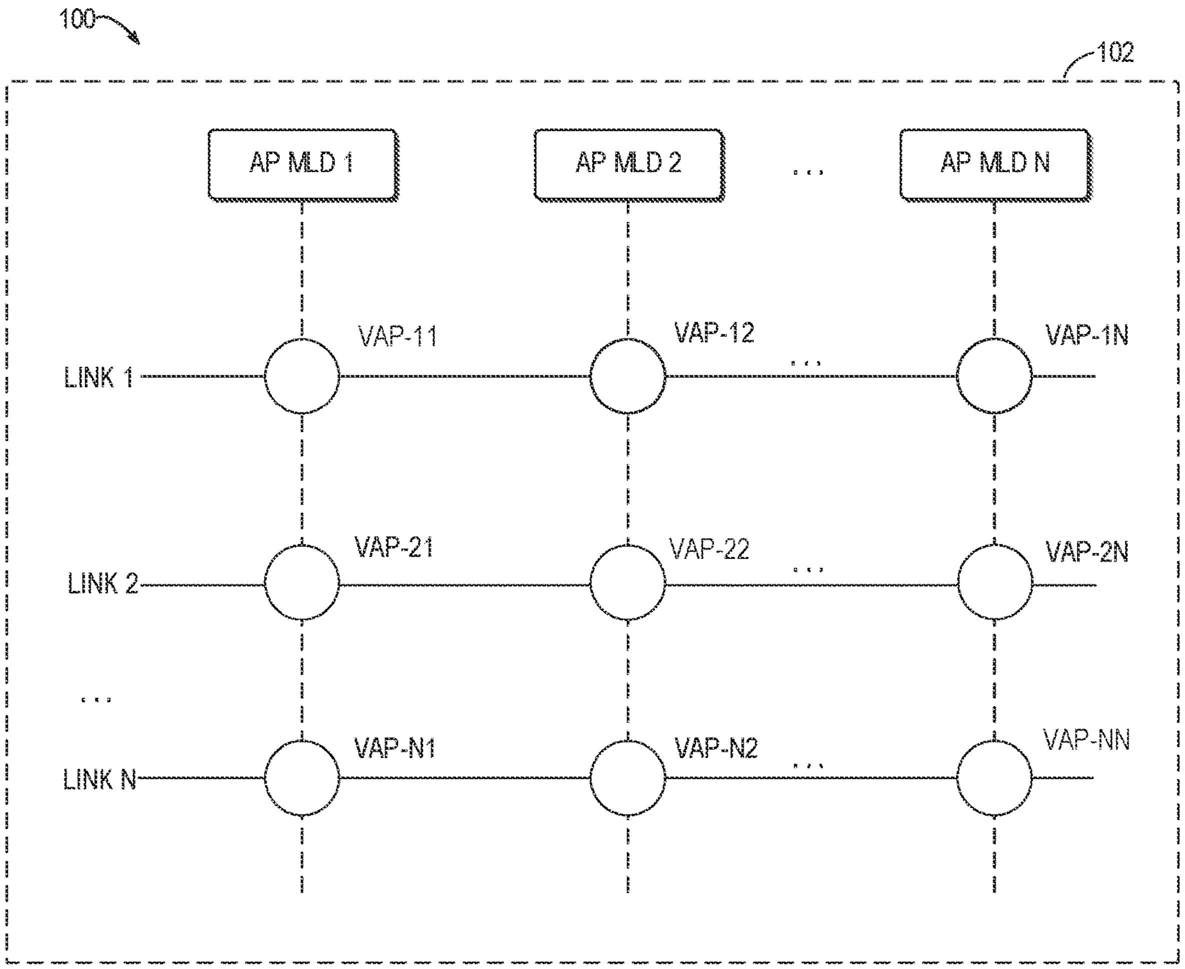
FIG. 1 illustrates an example environment in which example implementations of the present disclosure may be implemented.

FIG. 1 illustrates an example environment 100 in which example implementations of the present disclosure may be implemented. As shown in FIG. 1, the environment 100 comprises an AP 102, and the AP 102 supports both functionalities of MLO and MBSSID. The AP 102 comprises multiple links (or radios), i.e., the link 1, the link 2, . . . , and the link N. Each of the multiple links comprises multiple VAPs. As shown in FIG. 1, the VAP-11, the VAP-12, . . . , and the VAP-1N work on the link 1; the VAP-21, the VAP-22, . . . , and the VAP 2N work on the link 2; the VAP-N1, the VAP-N2, . . . , and the VAP-NN work on the link N. In addition, the AP 102 also comprises multiple AP MLDs, i.e., the AP MLD 1, the AP MLD 2, . . . , the AP MLD N. Each of the multiple AP MLDs also comprises multiple VAPs. As shown in FIG. 1, the VAP-11, the VAP-21, . . . , and the VAP N1 belong to the AP MLD 1; the VAP-12, the VAP 22, . . . , and the VAP N2 belong to the AP MLD 2; the VAP-1N, the VAP-2N, . . . , and the VAP NN belong to the AP MLD N.

In some implementations, because the MBSSID feature is enabled, MBSSID sets may be configured on the multiple links of the AP 102, and each of the MBSSID sets has one TX VAP and one or more non-TX VAPs. For example, in the environment 100, the VAP-11 and the VAP-12 on the link 1 may be comprised in a first MBSSID set, where the VAP-11 may be a TX VAP and the VAP-12 may be a non-TX VAP. Therefore, a beacon frame of the VAP-11 may comprise information of the VAP-11 and information of the VAP-12.

Furthermore, because a beacon frame of a VAP in an AP MLD may also carry information of all VAPs belonging to this AP MLD on multiple links, the beacon frame of the VAP-11 may also comprise information of the VAP-21.

In addition, the VAP-21 and the VAP-22 may be comprised in a second MBSSID set, where the VAP-22 may be a TX VAP and the VAP-21 may be a non-TX VAP. Therefore, a beacon frame of the VAP-22 may comprise information of the VAP-21 and information of the VAP-22. Because the VAP-21 and the VAP-11 belong to a same AP MLD (i.e., AP MLD 1), the information of the VAP-21 may comprise the information of the VAP-11. Therefore, the beacon frame of the VAP-22 may comprise the information of the VAP-11, the VAP-12, the VAP-21, and the VAP-22. Furthermore, because the VAP-12 and the VAP-22 belong to a same AP MLD (i.e., AP MLD 2), the information of the VAP-12 may comprise the information of the VAP-22. Thus, the beacon frame of the VAP-11 may also comprise the information of the VAP-11, the VAP-12, the VAP-21 and the VAP-22.

In this manner, if one of the TX VAPs (i.e., the VAP-11 and the VAP-22) is down, the beacon frame transmitted by another TX VAP may comprise information of all VAPs in both the first and the second MBSSID sets. As a result, the other VAPs can continue to operate. In addition, if one of the AP MLD 1 or the AP MLD 2 is down, the TX VAP on another AP MLD can continue to operate. Thus, the stability of the network can be improved.

Figure 2:
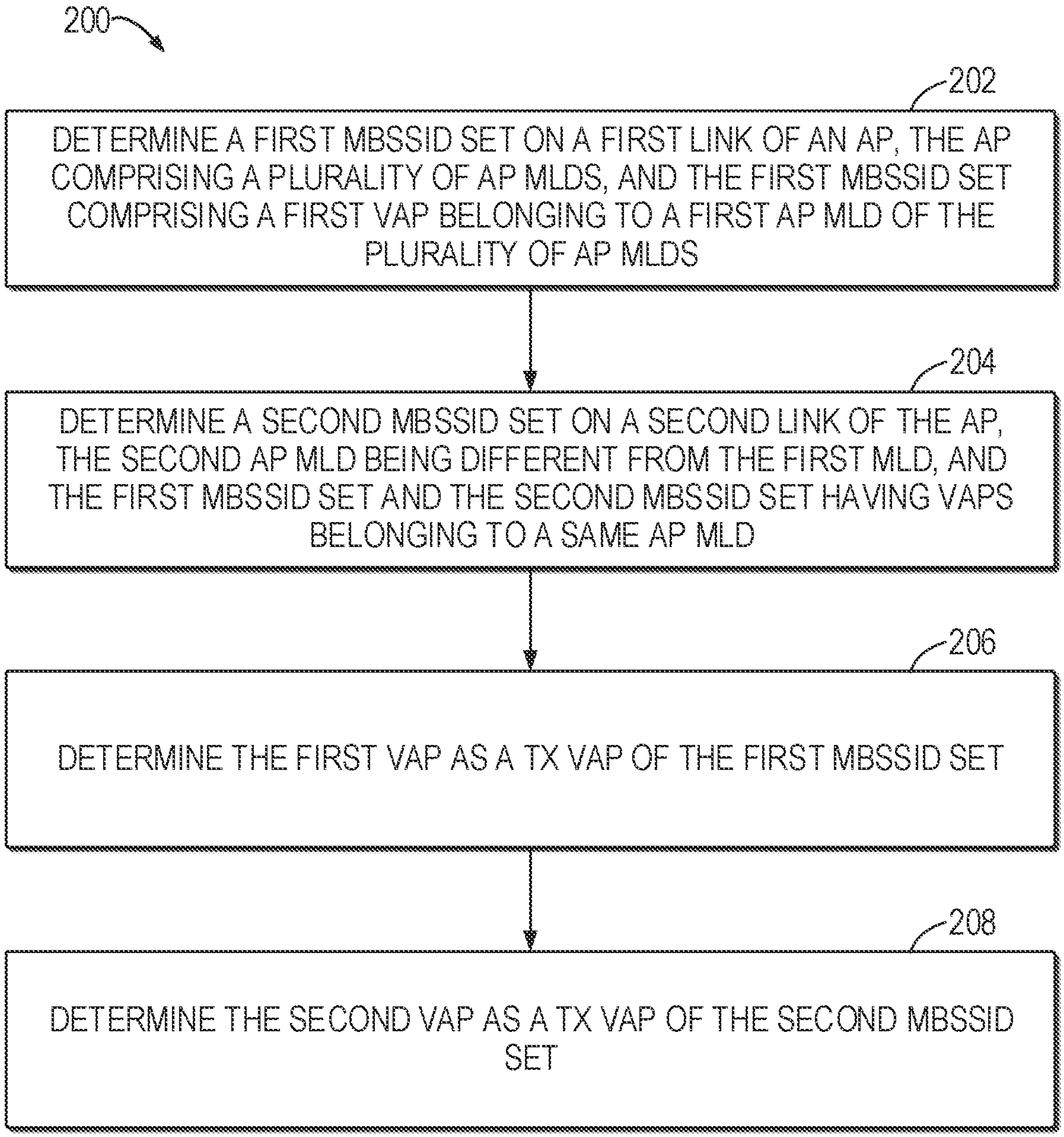
FIG. 2 is a flow chart illustrating a method for configuring an AP with MLO, and MBSSID enabled according to the implementations of the present disclosure.

FIG. 2 is a flow chart illustrating a method 200 for configuring an AP with MLO and MBSSID enabled according to the implementations of the present disclosure. The method 200 may be implemented by, for example, the AP 102 in FIG. 1. As shown in FIG. 2, at block 202, the method 200 may determine a first MBSSID set on a first link of an AP, wherein the AP comprises a plurality of AP MLDs, and the first MBSSID set comprises a first VAP belonging to a first AP MLD of the plurality of AP MLDs. For example, in the environment 100, as shown in FIG. 1, the AP 102 may comprise the AP MLD1, the AP MLD 2, . . . , and the AP MLD N. Furthermore, the AP 102 may also comprise the link 1, the link 2, . . . , and the link N. The AP 102 may determine a first MBSSID set on the link 1, where the first MBSSID set may comprise the VAP-11 (also referred to as the first VAP) belonging to the AP MLD 1 (also referred to as the first AP MLD) and the VAP-12 belonging to the AP MLD 2.

At block 204, the method 200 may determine a second MBSSID set on a second link of the AP, the second MBSSID set comprising a second VAP belonging to a second AP MLD, the second AP MLD being different from the first AP MLD, and the first MBSSID set and the second MBSSID set having VAPs belonging to a same AP MLD. For example, as shown in FIG. 1, in the environment 100, the AP 102 may determine a second MBSSID set on the link 2, where the second MBSSID set may comprise the VAP-21 belonging to the AP MLD 1 and the VAP-22 (also referred to as the second VAP) belonging to the AP MLD 2 (also referred to as the second AP MLD). In this configuration, the VAP-11 in the first MBSSID set and the VAP-21 in the second MBSSID set belong to a same AP MLD (i.e., AP MLD 1).

At block 206, the method 200 may determine the first VAP as a TX VAP of the first MBSSID set. For example, in the environment as shown in FIG. 1, the AP 102 may determine the VAP-11 as a TX VAP of the first MBSSID set. Therefore, the beacon frame of the VAP-11 may comprise the information of the VAP-11, the VAP-12, the VAP-21, and the VAP-22.

At block 208, the method 200 may determine the second VAP as a TX VAP of the second MBSSID set. For example, in the environment, as shown in FIG. 1, the AP 102 may determine the VAP-11 as a TX VAP of the first MBSSID set. Therefore, the beacon frame of the VAP-11 may also comprise the information of the VAP-11, the VAP-12, the VAP-21 and the VAP-22.

In this manner, if one of the TX VAPs (e.g., the VAP-11 and the VAP-22) is down, the beacon transmitted by another TX VAP may comprise information of all VAPs in both the first and the second MBSSID sets. As a result, the other VAPs can continue to operate. In addition, if one of the first AP MLD or the second AP MLD (e.g., the AP MLD 1 or the AP MLD 2) is down, the TX VAP on another AP MLD can continue to operate. Thus, the stability of the AP can be improved.

Figure 3:
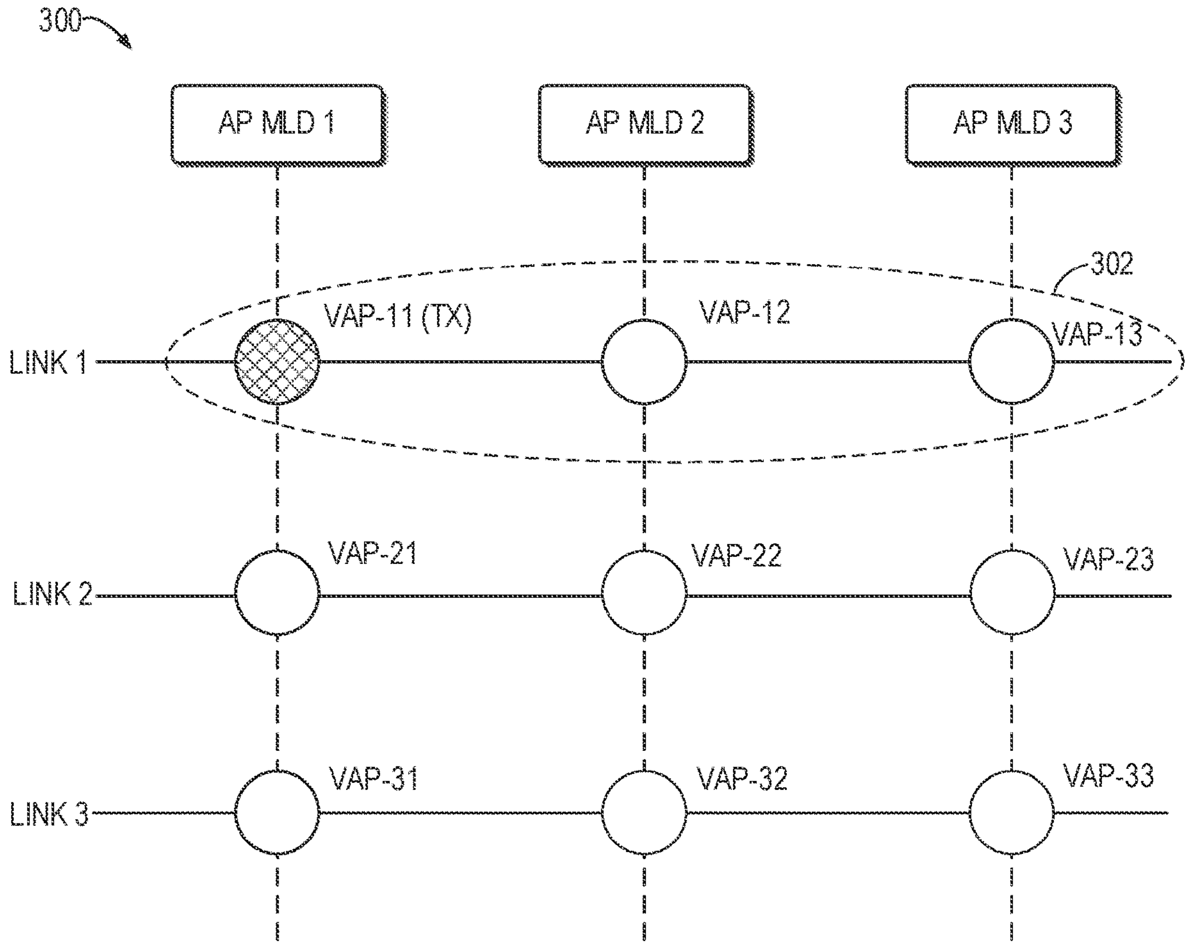
FIG. 3 is a schematic diagram illustrating an example configuration with an MBSSID set on one link of an AP according to the implementations of the present disclosure.

FIG. 3 is a schematic diagram illustrating an example configuration 300 with an MBSSID set on one link of an AP according to the implementations of the present disclosure. As shown in FIG. 3, the configuration 300 involves three links, three AP MLDs, and nine VAPs. The VAP-11, the VAP-12, and the VAP-13 work on the link 1; the VAP-21, the VAP-22, and the VAP-23 work on the link 2; the VAP-31, the VAP-32, and the VAP-33 work on the link 3. Furthermore, the VAP-11, the VAP-21 and the VAP-31 belong to the AP MLD 1; the VAP-12, the VAP-22, and the VAP-32 belong to the AP MLD 2; the VAP-13, the VAP-23, and the VAP-33 belong to the AP MLD 3.

In the configuration 300, the VAP-11, the VAP-12, and the VAP-13 working on the link 1 are comprised in an MBSSID set 302, where the VAP-11 is configured to a TX VAP. Therefore, the beacon frame of the VAP-11 may comprise the information of the VAP-12 and the VAP-13 because these three VAPs are comprised in the MBSSID set 302. Furthermore, the beacon frame of the VAP-11 may also comprise the information of the VAP-21 and the VAP-31 because these three VAPs belong to a same AP MLD.

However, in the configuration 300, VAPs outside the MBSSID set 302 may transmit beacon frames by themselves, which may increase a number of frames in the air. Furthermore, beacon frames of these VAPs outside the MBSSID set 302 carry less information of other VAPs, which may reduce the stability of the network.

Figure 4A:
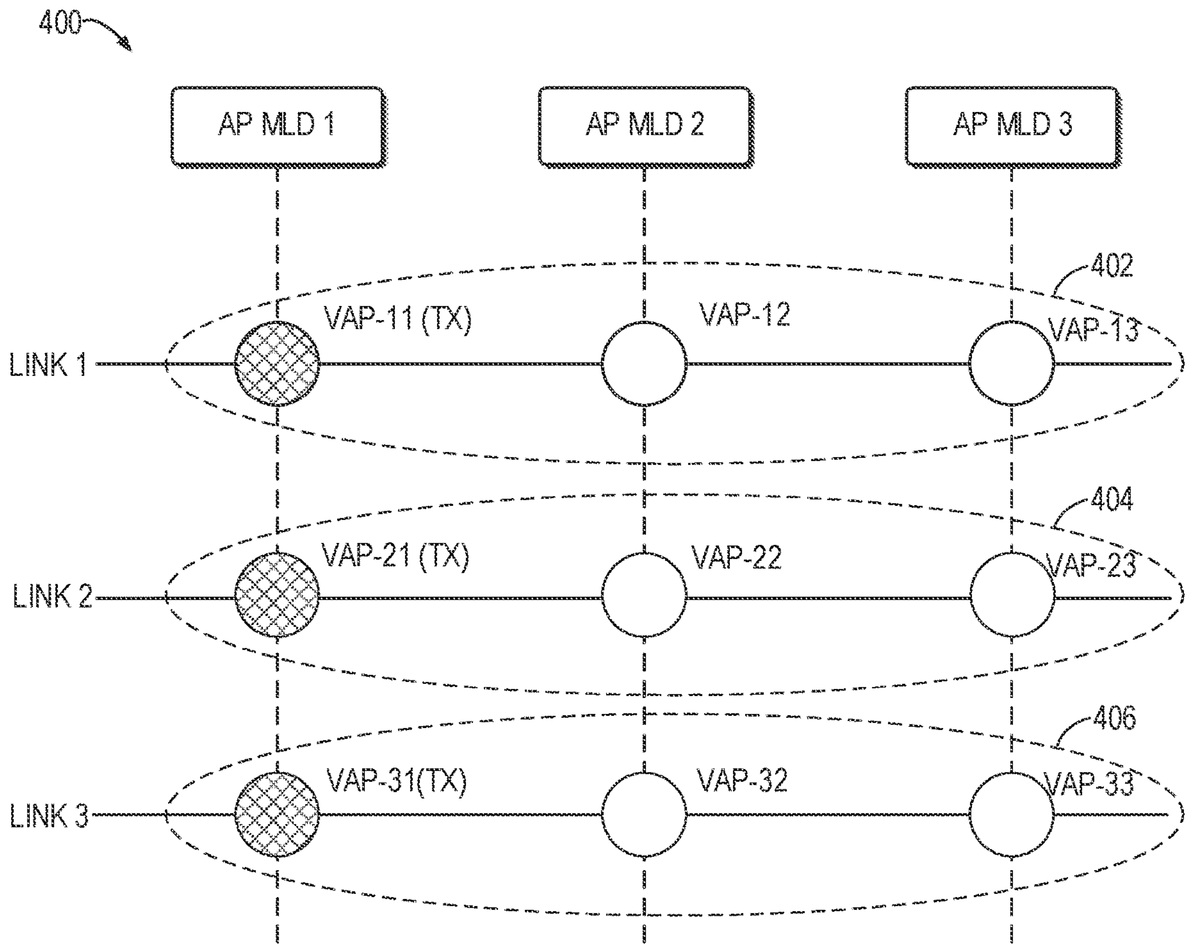
FIGS. 4A and 4B are schematic diagrams illustrating an example configuration with multiple MBSSID sets on multiple links of an AP according to the implementations of the present disclosure.
Figure 4B:
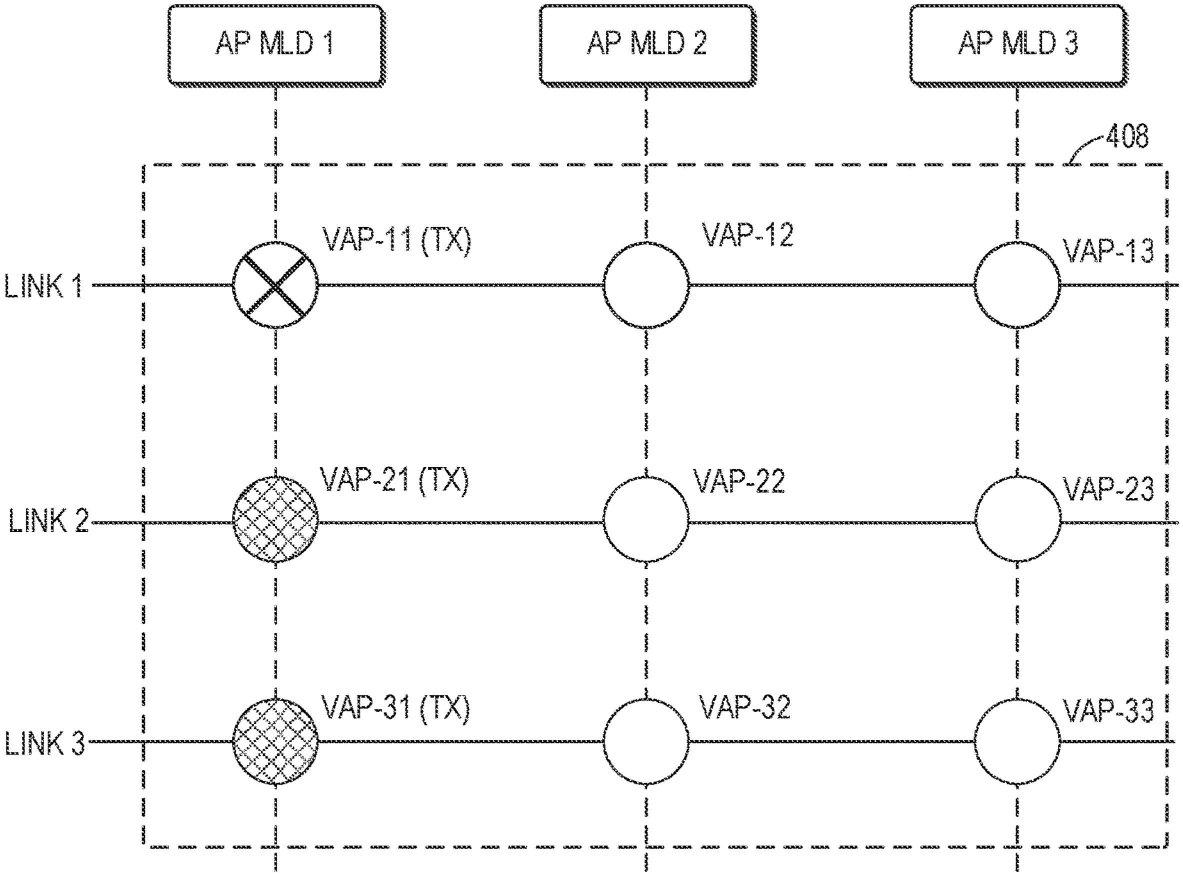

In some implementations, in order to improve the stability of the network and reduce the number of frames in the air, MBSSID sets may be configured on each link of the AP. FIGS. 4A and 4B are schematic diagrams illustrating an example configuration 400 with multiple MBSSID sets on multiple links of an AP according to the implementations of the present disclosure. As shown in FIG. 4A, the configuration 400 involves three links, three AP MLDs, and nine VAPs, which are the same as those in the configuration 300 as shown in FIG. 3. However, every link in the configuration 400 comprises a MBSSID set. An MBSSID set 402 on the link 1 comprises the VAP-11, the VAP-12, and the VAP-13, where the VAP-11 is a TX VAP, and the VAP-12 and the VAP-13 are non-TX VAPs. A MBSSID set 404 on the link 2 comprises the VAP-21, the VAP-22, and the VAP-23, where the VAP-21 is a TX VAP, and the VAP-22 and the VAP-23 are non-TX VAPs. A MBSSID set 406 on the link 3 comprises the VAP-31, the VAP-32, and the VAP-33, where the VAP-31 is a TX VAP, and the VAP-32 and the VAP-33 are non-TX VAPs.

In the configuration 400, a beacon frame of the VAP-11 may comprise information of the VAP-12 and the VAP-13 because these VAPs are comprised in the MBSSID set 402. Furthermore, the beacon frame of the VAP-11 may comprise information of the VAP-21 and the VAP-31 because these VAPs belong to the AP MLD 1. In addition, a beacon frame of the VAP-21 may comprise information of the VAP-22 and the VAP-23 because these VAPs are comprised in the MBSSID set 404, and a beacon frame of the VAP-31 may comprise information of the VAP-32 and the VAP-33 because these VAPs are comprised in the MBSSID set 406. Therefore, the beacon frame of the VAP-11 may comprise information of all the nine VAPs in the configuration 400. Similarly, the beacon frames of the VAP-21 and the VAP-31 may also comprise the information of all the nine VAPs in the configuration 400.

As shown in FIG. 4B, all VAPs are comprised in a VAP group 408, and a beacon frame of each of the TX VAPs (i.e., VAP-11, VAP-21, VAP-31) may comprise the information of all VAPs in the VAP group 408. In this manner, if the VAP-11 is down, the VAP-12 and the VAP-13 can continue to operate because the beacon frames transmitted by the VAP-21 and the VAP-31 also comprise the information of the VAP-12 and the VAP-13. Therefore, the stability of the network can be improved. In addition, in the configuration 400, only three TX VAPs are transmitting beacon frames, such that the number of frames in the air can be reduced. As a result, the performance of the network can be improved.

Figure 5:
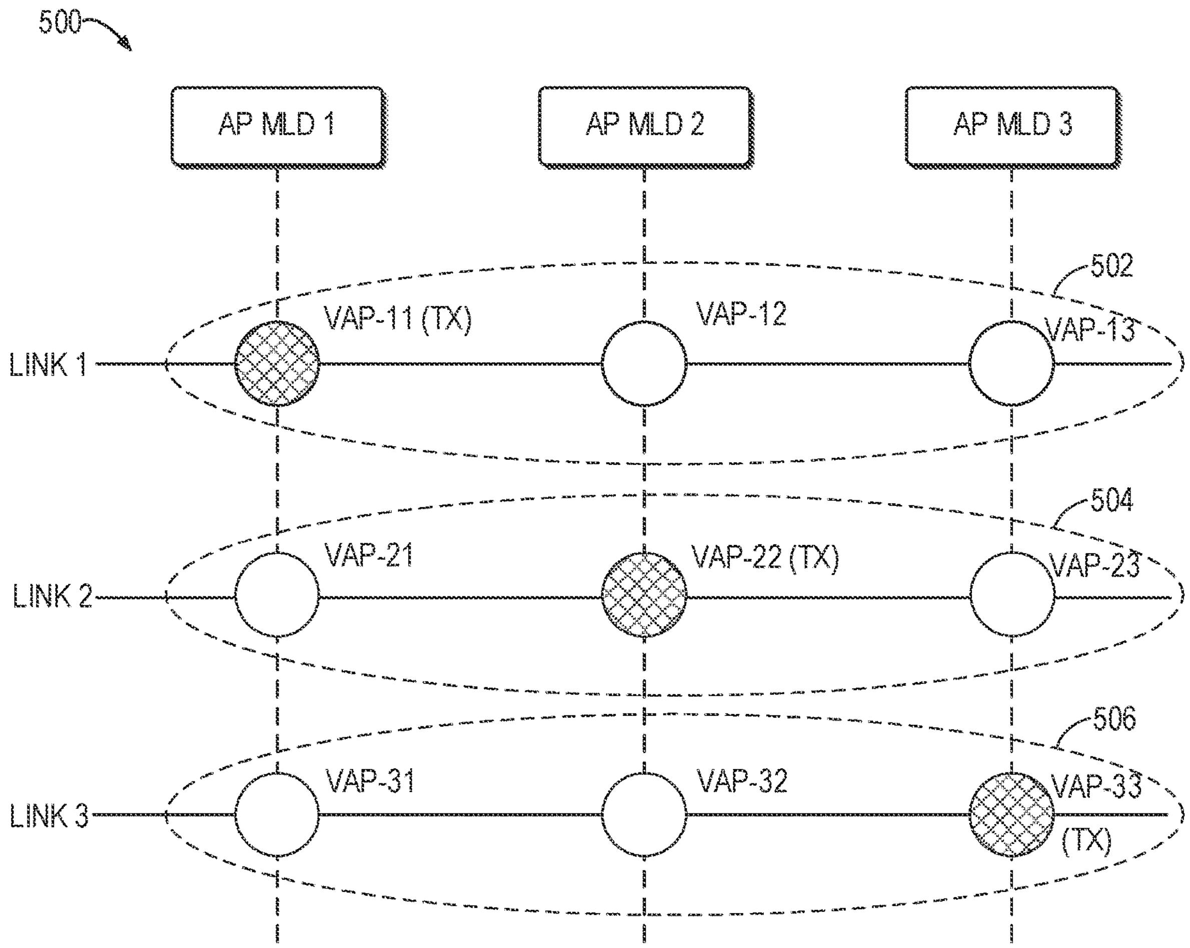
FIG. 5 is a schematic diagram illustrating another example configuration with multiple MBSSID sets on multiple links of an AP according to the implementations of the present disclosure.

In configuration 400, if the AP MLD 1 is down, all TX VAPs cannot function, resulting in the inability to transmit beacon frames. In some implementations, the VAPs belonging to different AP MLDs may be determined as the TX VAPs of the MBSSID sets on the multiple links. FIG. 5 is a schematic diagram illustrating another example configuration 500 with multiple MBSSID sets on multiple links of an AP according to the implementations of the present disclosure. As shown in FIG. 5, the configuration 500 involves three links, three AP MLDs and nine VAPs, which are the same as those in the configuration 400 as shown in FIG. 4. However, in the configuration 500, a MBSSID set 502 comprises the VAP-11, the VAP-12 and the VAP-13, where the VAP-11 is a TX VAP, and the VAP-12 and the VAP-13 are non-TX VAPs. A MBSSID set 504 comprises the VAP-21, the VAP-22, and the VAP-23, where the VAP-22 is a TX VAP, and the VAP-22 and the VAP-23 are non-TX VAPs. A MBSSID set 506 comprises the VAP-31, the VAP-32, and the VAP-33, where the VAP-33 is a TX VAP, and the VAP-31 and the VAP-32 are non-TX VAPs.

In the configuration 500, the beacon frame of the VAP-11 may comprise the information of the VAP-12 and the VAP-13 because these VAPs are comprised in the MBSSID set 502. Furthermore, the beacon frame of the VAP-11 may also comprise the information of the VAP-21 and the VAP-31 because these VAPs belong to the AP MLD 1. In addition, the information of the VAP-12 may comprise the information of the VAP-22 and the VAP-32 because these VAPs belong to the AP MLD 2, and the information of the VAP-13 may comprise the information of the VAP-23 and the VAP-33 because these VAPs belong to the AP MLD 3. Therefore, the beacon frame of the VAP-11 may also comprise the information of the VAP-22, the VAP-32, the VAP 23 and the VAP-33. As a result, the VAP-11 may comprise information of all VAPs in the configuration 500. Similarly, the beacon frames of the VAP-22 and the VAP-33 may also comprise all VAPs in the configuration 500.

In this manner, if the AP MLD 1 is down, the VAP-11 cannot function, resulting in the inability to transmit beacon frames. However, in the case that the VAP-22 and the VAP-33 are still available, all VAPs can continue to operate, because the beacon frames of the VAP-22 and the VAP-33 comprise information of all VAPs in the configuration 500. Thus, the stability of the network can be improved.

In some situations, the size of the beacon frame of the TX VAP may be large, then the beacon frame may be split into multiple beacon fragments. Profile Periodicity (PP) indicates the least number of beacon frames a wireless device needs to receive in order to discover all of the active non-TX BSSIDs in a same MBSSID set. In a case of 16 VAPs, a default value of PP maybe 3, and the PP value may increase to 6 in the worst case. This results in clients taking a longer time to obtain the desired BSS information. Consequently, the clients also require more time to receive broadcast/multicast delivery traffic indication message (DTIM) information and broadcast target wake time (TWT) information from the beacon frames. In some implementations, the AP may generate a first beacon fragment and a second beacon fragment based on a first beacon information of the first VAP. Furthermore, the AP may generate a third beacon fragment and a fourth beacon fragment based on a second beacon information of the second VAP, wherein the third beacon fragment corresponds to the first beacon fragment, and the fourth beacon frame corresponds to the second beacon frame. In addition, in response to transmitting the first beacon fragment by the first VAP, the second VAP may transmit the fourth beacon fragment.

Figure 6:
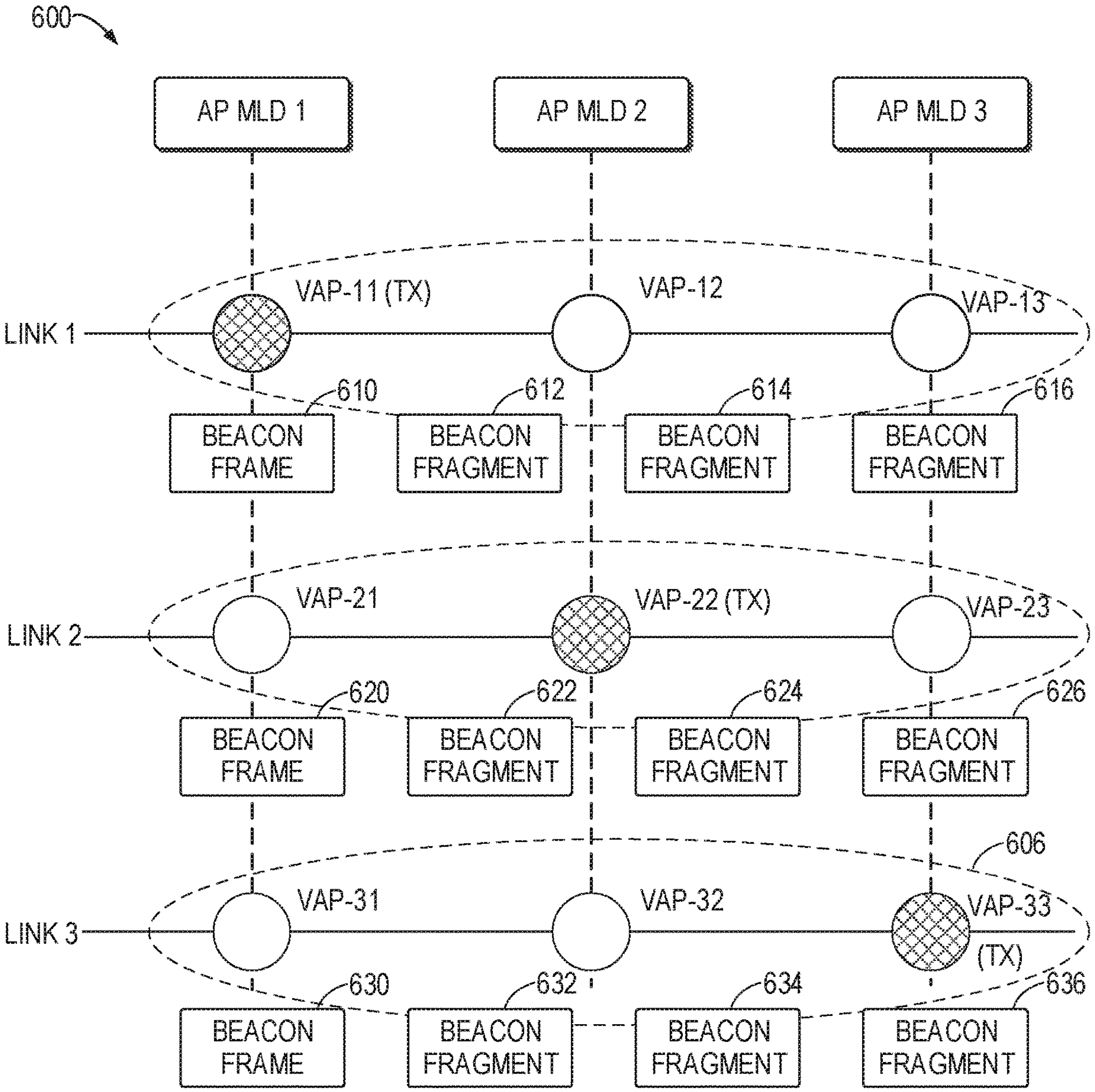
FIG. 6 is a schematic diagram illustrating an example configuration with beacon fragments according to the implementations of the present disclosure.

FIG. 6 is a schematic diagram illustrating an example configuration with beacon fragments according to the implementations of the present disclosure. As shown in FIG. 6, the configuration 600 involves three links, three AP MLDs, nine VAPs and three MBSSID sets, which are the same as those in the configuration 500 as shown in FIG. 5. As shown in FIG. 6, a beacon frame 610 of the VAP-11, a beacon frame 620 of the VAP-22, and a beacon frame 630 of the VAP-33 may comprise information of all VAPs in the configuration 600. However, because the sizes of these beacon frames are too large, the AP may generate beacon fragments 612, 614, and 616 based on the beacon frame 610, generate beacon fragments 622, 624, and 626 based on the beacon frame 610, and generate beacon fragments 632, 634 and 636 based on the beacon frame 630. The beacon fragments 612, 622, and 632 may have similar content, for example, each of them may comprise the information of the VAP-11, the VAP-12, and the VAP-13. The beacon fragments 614, 624, and 634 may have similar content, for example, each of them may comprise the information of the VAP-21, the VAP-22, and the VAP-23. The beacon fragments 616, 626, and 636 may have similar content; for example, each of them may comprise the information of the VAP-31, the VAP-32, and the VAP-33.

A client needs to collect three beacon fragments to obtain the complete information of the nine VAPs. If the VAP-11, the VAP-22, and the VAP-33 transmit the beacon fragments 612, 622, and 632 simultaneously, then transmit the beacon fragments 614, 624, and 634 simultaneously, then transmit the beacon fragments 616, 626, and 636 simultaneously, the client can collect the complete information of the nine VAPs after two beacon intervals (e.g., 200 time units (TUs)). In the configuration 600, the VAP-11, the VAP-22, and the VAP-33 may be configured to transmit the beacon fragments 612, 624, and 636 simultaneously, then transmit the beacon fragments 614, 626, and 632 simultaneously, then transmit the beacon fragments 616, 622 and 634 simultaneously, the client can collect the complete information of the nine VAPs within one beacon transmission duration (e.g., 20 TU).

In this manner, the time required for the client to collect complete beacon information can be reduced, thereby the network performance can be improved.

Figure 7:
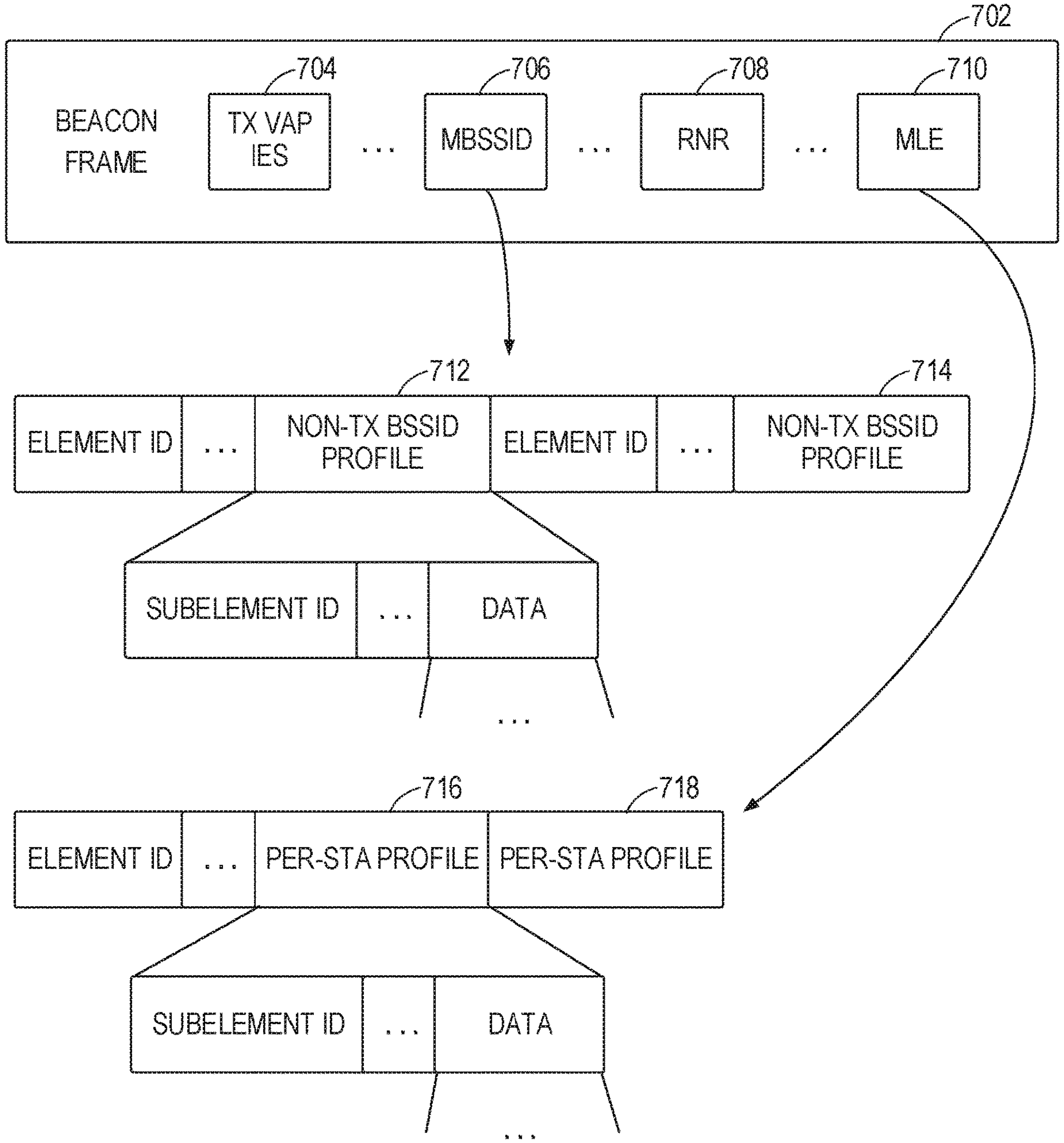
FIG. 7 is a schematic diagram illustrating a beacon frame format of a TX VAP according to the implementations of the present disclosure.

In an AP with MLO and MBSSID enabled, the size of the beacon frames may be large. In order to reduce beacon fragmentation, the size of a beacon frame may be controlled under a size limitation (e.g., 1500 bytes). FIG. 7 is a schematic diagram illustrating an example beacon frame format of a TX VAP according to the implementations of the present disclosure. As shown in FIG. 7, a beacon frame 702 may comprise TX VAP information elements (IEs) 704, MBSSID IE 706, RNR IE 708 and MLE IE 710. The TX VAP IEs 704 may comprise the information of the TX VAP transmitting the beacon frame 702. The MBSSID IE 706 may comprise non-TX BSSID profiles corresponding to the non-TX VAPs in the MBSSID set. In the example as shown in FIG. 7, the MBSSID set comprises one TX-VAP and two non-TX VAPs. Therefore, the MBSSID IE 706 comprises two non-TX BSSID profile IEs 712 and 714. Each of the non-TX BSSID profile IEs 712 and 714 comprises fields such as sub element ID and data.

Furthermore, the MLE IE 710 may comprise STA profiles corresponding to the VAPs in an AP MLD. In the example shown in FIG. 7, the AP MLD comprises two VAPs in the same AP MLD as the current TX VAP. Therefore, the MLE IE 710 comprises two per-STA profile IEs 716 and 718. Each of the per-STA profile IEs 716 and 718 comprises fields such as sub-element ID and data. In addition, the RNR IE 708 may comprise target beacon transmission time (TBTT) information of the neighbor VAPs. It can be observed that in an AP with MLO and MBSSID enabled, the information of all the VAPs may be conveyed in a single beacon frame. This implies that the beacon frame may advertise IEs corresponding to the BSSs belonging to the same MBSSID set and AP MLD. Consequently, this leads to a large beacon frame size and results in beacon fragmentation.

In order to reduce beacon fragments, the AP may adjust the configuration dynamically. In some implementations, the AP may determine a first VAP number of VAPs in the first MBSSID set. In response to the first VAP number being greater than a first threshold, the AP may perform operations for adjusting an AP configuration. In some implementations, the AP may determine a second VAP number of VAPs belonging to the first AP MLD. In response to the second VAP number being greater than a second threshold, the AP may perform the operations for adjusting the configuration. In some implementations, the AP may determine a third VAP number of VAPs belonging to the first AP MLD and the first MBSSID set. In response to the third VAP number being greater than a third threshold, the AP may perform the operations for adjusting the configuration.

In some implementations, the AP may determine a number of beacon frames transmitted by a VAP within a TBTT, and determine a number of TX VAPs on a radio of the AP. Furthermore, the AP may determine a maximum number of virtual APs on the radio of the AP. In response to the beacon frame number, the TX VAP number and the maximum number satisfy a predefined condition, the AP may perform the operations for adjusting the configuration. In some implementations, the predefined condition is the beacon frame number times the TX VAP number being greater than the maximum number. In some implementations, in order to determine the number of beacon frames transmitted by the VAP within the TBTT, the AP may determine a first duration used for transmitting a beacon frame and determine a second duration used for transmitting a fast initial link setup (FILS) frame. Then, the AP may determine the number of beacon frames transmitted by the VAP within the TBTT based on the first duration and the second duration.

Figure 8:
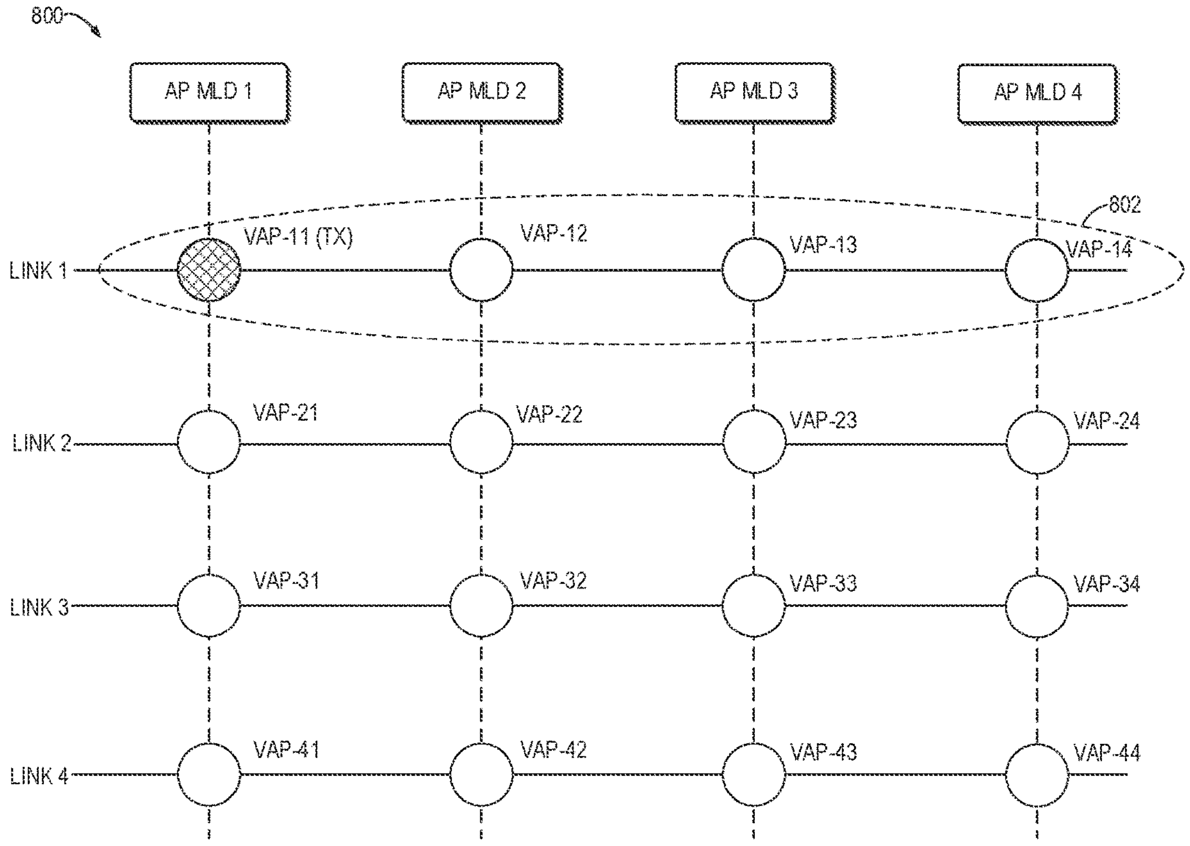
FIG. 8 is a schematic diagram illustrating an example configuration with four AP MLDs and four links according to the implementations of the present disclosure.

FIG. 8 is a schematic diagram illustrating an example configuration 800 with four AP MLDs and four links according to the implementations of the present disclosure. As shown in FIG. 8, the configuration 800 involves AP MLDs 1, 2, 3, and 4, links 1, 2, 3, and 4, and twelve VAPs, where the VAP-11 is a TX VAP of the MBSSID set 802. Assume there are X VAPs in one MBSSID set and Y VAPs (which can be treated as the VAP slot resource number, with each MLD link occupying one VAP slot) in one MLD. The VAP BSS info will carry the same IEs, with no RNR IE involved. The RNR IE can be considered in X or Y, depending on the implementation of vendors. The AP may adjust the configuration in the case that the X and Y do not satisfy at least one of the following equations.

$$1 < X \,\&Y \le \text{MAX } VAP\ NUM_{MBSSID\ and\ MLD} \tag{1}$$

$$1 < X \le \text{MAX } VAP\ NUM_{MBSSID} \tag{2}$$

$$1 < Y \le \text{MAX } VAP\ NUM_{MLD} \tag{3}$$

$$NUM_{avg\ beacon} \times NUM_{MBSSID} \le \text{MAX } VAPs \text{ on Radio} \tag{4}$$

Where X&Y denotes the number of VAPs belonging to the same MBSSID set and AP MLD. MAX VAP $NUM_{MBSSID\ and\ MLD}$ denotes a maximum limit of the value of X&Y. MAX VAP $NUM_{MBSSID}$ denotes a maximum limit of the number of VAPs in an MBSSID set. MAX VAP $NUM_{MLD}$ denotes a maximum limit of the number of VAPs in an AP MLD. $NUM_{avg\ beacon}$ denotes a number of beacon frames transmitted by a VAP within a TBTT, considering FILS frames as a part of a beacon frame. $NUM_{MBSSID}$ denotes a number of TX APs on a radio of the AP (or a number of MBSSID sets on a radio of the AP). MAX VAPs on Radio denotes a maximum number of VAPs on the radio of the AP in a case that the MBSSID features is disabled. MAX VAPs on Radio may indicate the maximum airtime occupied due to transmitting beacon frames by each VAP individually on the same radio.

In the example of the configuration 800 as shown in FIG. 8, MAX VAP $NUM_{MBSSID}$ and MLD may be 5, MAX VAP $NUM_{MBSSID}$ may be 4, MAX VAP $NUM_{MLD}$ may be 4, and Max VAPs on Radio may be 16. As shown in FIG. 8, the VAP number in the MBSSID set 802 (i.e., X) is 4, including the VAP-11, the VAP-12, the VAP-13, and the VAP-14, which satisfies the equation (2). The VAP number in the AP MLD 1 (i.e., Y) is 4, including the VAP-11, the VAP-21, the VAP-31, and the VAP-41, which satisfies the equation (3). In this case, the value of X&Y is 7, including the VAP-11, the VAP-12, the VAP-13, the VAP-14, the VAP-21, the VAP-31, and the VAP-41. Considering MAX VAP $NUM_{MBSSID\ and\ MLD}$ is 5, the configuration 800 also does not satisfy the equation (1).

In order to determine the value of $NUM_{avg\ beacon}$, the AP needs to determine the number of beacon frames and the FILS frames transmitted on the radio within a TBTT. The AP may send 1 beacon frame, followed by 4 FILS frames (the period of sending FILS frames is 20 TU) within a TBTT (100 TU). Furthermore, the FILS frame size is smaller than the beacon frame size. Assuming that 2 FILS frames can convey the complete information of a single beacon frame, a TX VAP may transmit 3 beacon frames within a TBTT ($NUM_{avg\ beacon}$=1+4÷2=3). In addition, in the configuration 800, the link 1 comprises one MBSSID set (the MBSSID set 802). Thus, there is one TX VAP (the VAP-11) on the link 1, which satisfies the equation (4). In conclusion, the configuration 800 satisfies the equations (2)-(4), but does not satisfy the equation (1). Thus, the AP may perform operations to reduce the value of X&Y.

In this manner, the AP can determine whether the beacon frame is likely to be fragmented based on the current configuration. Therefore, the occurrence of beacon fragmentation can be reduced by adjusting the configuration in a timely manner, which can improve the network performance and reduce the latency.

In some implementations, the operations for adjusting the AP configuration may comprise moving a third VAP in the first MBSSID set to a third MBSSID set on the first link of the AP. In some implementations, the operations for adjusting the AP configuration may comprise in response to all MBSSID set on the first link of the AP having no space, removing the VAP from the third MLD. In some implementations, the operations for adjusting the AP configuration may comprise disabling an MBSSID feature on the first link.

Figure 9:
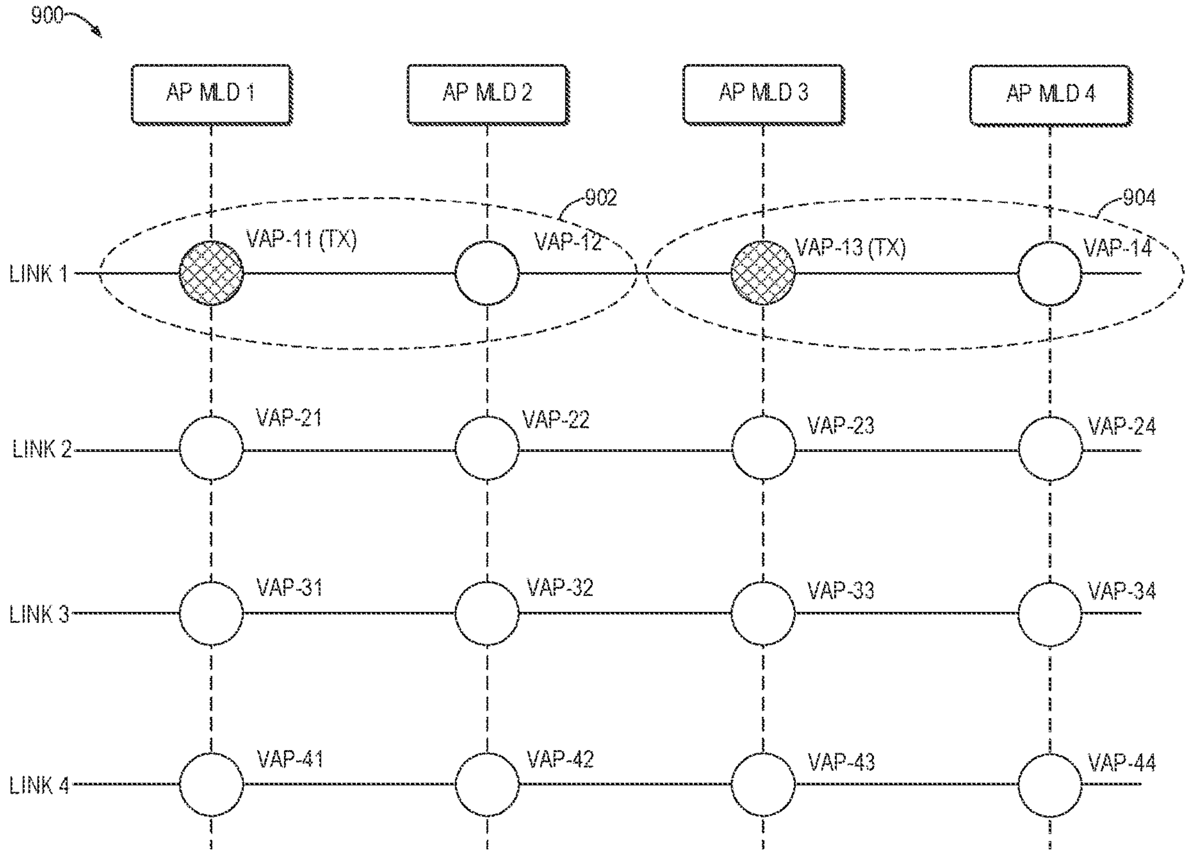
FIG. 9 is a schematic diagram illustrating an example adjusted configuration with four AP MLDs and four links according to the implementations of the present disclosure.

FIG. 9 is a schematic diagram illustrating an example adjusted configuration 900 with four AP MLDs and four links according to the implementations of the present disclosure. As shown in FIG. 9, the VAP-13 and the VAP-14 are moved from the original MBSSID set (i.e., the MBSSID set 802 in FIG. 8) to a new MBSSID set 904, and the VAP-13 becomes the TX VAP of the MBSSID set 904. As a result, the MBSSID set 902 only comprises the VAP-11 and the VAP-12. In the adjusted configuration 900, the number of VAPs in the MBSSID set 902 is 2 (i.e., X=2), the number of VAPs belonging to the AP MLD 1 is 4 (i.e., Y=4), and the number of VAPs in the MBSSID set 902 or belonging to the AP MLD 1 is 5 (i.e., X&Y=5). In addition, the number of VAPs in the MBSSID set 904 is 2 (i.e., X=2), the number of VAPs belonging to the AP MLD 3 is 4 (i.e., Y=4), and the number of VAPs in the MBSSID set 904 or belonging to the AP MLD 3 is 5 (i.e., X&Y=5). Thus, the adjusted configuration 900 satisfies the equations (1)-(3).

Furthermore, in the adjusted configuration 900, the link 1 comprises two TX VAPs (i.e., the VAP-11 and the VAP-13) corresponding to two MBSSID sets, thus the value of $NUM_{MBSSID}$ is 2. Because the value of $NUM_{avg\ beacon}$ is 3, the value of $NUM_{avg\ beacon} \times NUM_{MBSSID}$ is 6, which is less than MAX VAPs on Radio. Therefore, the adjusted configuration 900 satisfies the equations (1)-(4), thus the beacon fragmentation can be reduced.

In some implementations, if there is no space for creating the new MBSSID set 904, the AP may remove some of the VAP-11, the VAP-21, the VAP-31, and the VAP-41 from the AP MLD 1, or disable the MBSSID feature on the link 1, such that the configuration can satisfy the equations (1)-(4) as well.

In this manner, by reducing the beacon frame size of the TX VAPs, the beacon fragmentation can be minimized. Consequently, the transmission delay of the beacon frames can be reduced, which is crucial for applications or services requiring more timely responses, such as real-time audio and video streaming.

Figure 10:
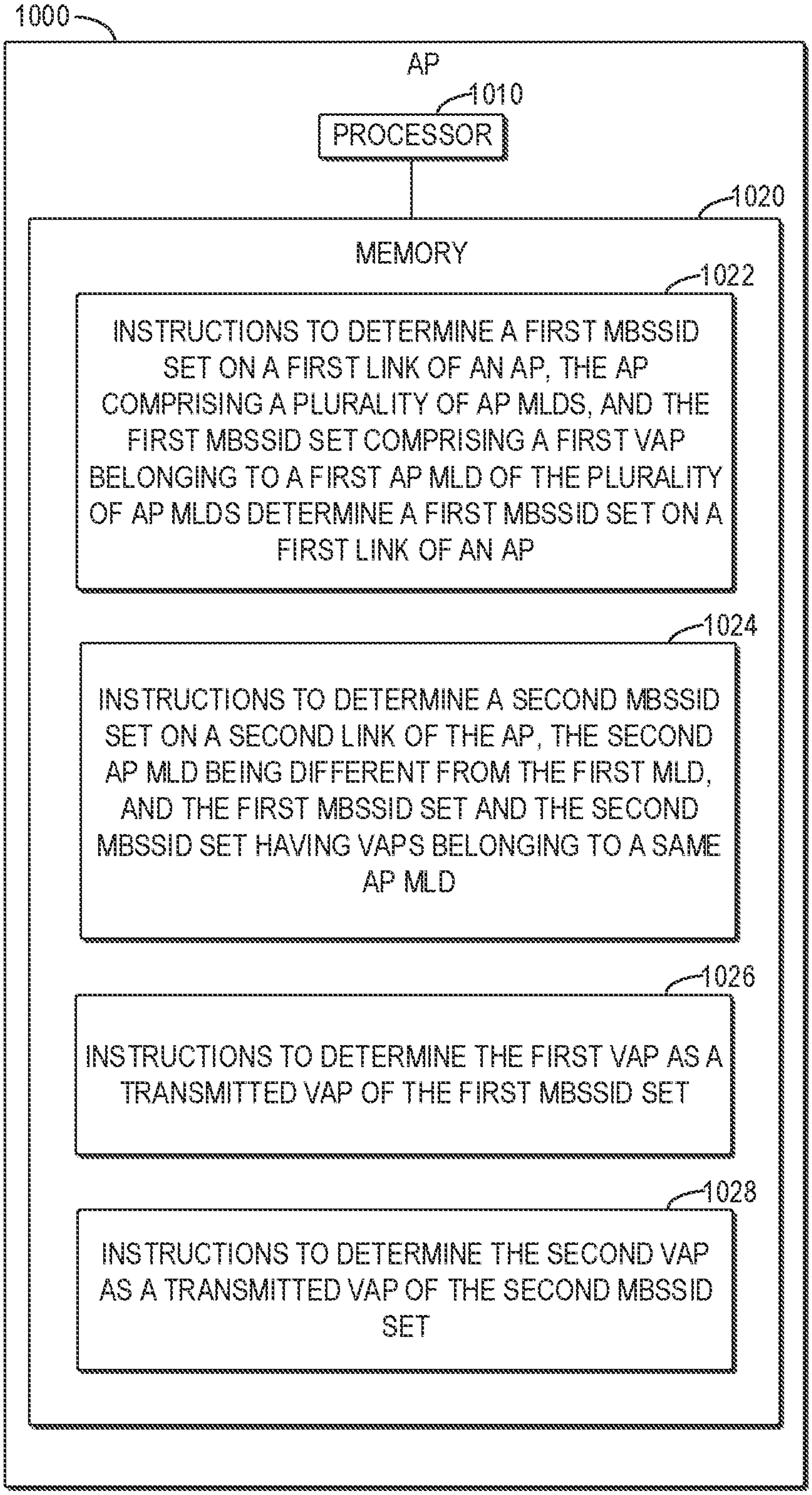
FIG. 10 is a diagram illustrating an example AP according to the implementations of the present disclosure.

FIG. 10 is a diagram illustrating an example AP 1000 according to the implementations of the present disclosure. As shown in FIG. 10, the AP 1000 comprises at least one processor 1010, and a memory 1020 coupled to the at least one processor 1010. The memory 1020 stores instructions 1022, 1024, 1026, and 1028 to cause the processor 1010 to perform actions according to example implementations of the present disclosure.

As shown in FIG. 10, the memory 1020 stores instructions 1022 to determine a first MBSSID set on a first link of an AP, the AP comprising a plurality of AP MLDs, and the first MBSSID set comprising a first VAP belonging to a first AP MLD of the plurality of AP MLDs. The memory 1020 further stores instructions 1024 to determine a second MBSSID set on a second link of the AP, the second MBSSID set comprising a second VAP belonging to a second AP MLD, the second AP MLD being different from the first AP MLD, and the first MBSSID set and the second MBSSID set having VAPs belonging to a same AP MLD. The memory 1020 further stores instructions 1026 to determine the first VAP as a TX VAP of the first MBSSID set. In addition, the memory 1020 further stores instructions 1028 to determine the second VAP as a TX VAP of the second MBSSID set.

The stored instructions and the functions that the instructions may perform can be understood with reference to implementations as described above. For brevity, the details of instructions 1022, 1024, 1026, and 1028 will not be discussed herein.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:

determining a first multiple basic service set identifier (MBSSID) set on a first link of an access point (AP), the AP comprising a plurality of AP multiple-link devices (MLDs), and the first MBSSID set comprising a first virtual AP belonging to a first AP MLD of the plurality of AP MLDs;

determining a second MBSSID set on a second link of the AP, the second MBSSID set comprising a second virtual AP belonging to a second AP MLD, the second AP MLD being different from the first AP MLD, and the first MBSSID set and the second MBSSID set having virtual APs belonging to a same AP MLD;

determining the first virtual AP as a transmitted virtual AP of the first MBSSID set;

determining the second virtual AP as a transmitted virtual AP of the second MBSSID set;

generating a first beacon fragment and a second beacon fragment based on a first beacon information of the first virtual AP;

generating a third beacon fragment and a fourth beacon fragment based on a second beacon information of the second virtual AP, the third beacon fragment corresponding to the first beacon fragment, the fourth beacon frame corresponding to the second beacon frame; and in response to transmitting the first beacon fragment by the first virtual AP, transmitting the fourth beacon fragment by the second virtual AP.

2. The method of claim 1, further comprising:

determining a first virtual AP number of virtual APs in the first MBSSID set; and in response to the first virtual AP number being greater than a first threshold, performing operations for adjusting a AP configuration.

3. The method of claim 2, further comprising:

determining a second virtual AP number of virtual APs belonging to the first AP MLD; and in response to the second virtual AP number being greater than a second threshold, performing the operations for adjusting the AP configuration.

4. The method of claim 3, further comprising:

determining a third virtual AP number of virtual APs belonging to the first AP MLD and the first MBSSID set; and in response to the third virtual AP number being greater than a third threshold, performing the operations for adjusting the AP configuration.

5. The method of claim 4, further comprising:

determining a number of beacon frames transmitted by a virtual AP within a target beacon transmission time (TBTT);

determining a number of transmitted virtual APs on a radio of the AP;

determining a maximum number of virtual APs on the radio of the AP; and in response to the number of beacon frames, the number of transmitted virtual APs and the maximum number satisfy a predefined condition, performing the operations for adjusting the AP configuration.

6. The method of claim 5, wherein the predefined condition is the beacon frame number times the transmitted virtual AP number being greater than the maximum number.

7. The method of claim 5, wherein determining the number of beacon frames transmitted by the virtual AP within the TBTT comprising:

determining a first duration used for transmitting a beacon frame;

determining a second duration used for transmitting a fast initial link setup (FILS) frame; and determining the number of beacon frames transmitted by the virtual AP within the TBTT based on the first duration and the second duration.

8. The method of claim 2, wherein the operations for adjusting the AP configuration comprising:

moving a third virtual AP in the first MBSSID set to a third MBSSID set on the first link of the AP.

9. The method of claim 8, wherein the third virtual AP belongs to a third MLD, and the operations for adjusting the AP configuration further comprising:

in response to all MBSSID sets on the first link of the AP having no space, removing the virtual AP from the third MLD.

10. The method of claim 2, wherein the operations for adjusting the AP configuration further comprising:

disabling a MBSSID feature on the first link.

11. An access point (AP) comprising:

at least one processor; and a memory coupled to the at least one processor, the memory storing instructions to cause the at least one processor to:

determine a first multiple basic service set identifier (MBSSID) set on a first link of the AP, the AP comprising a plurality of AP multiple-link devices (MLDs), and the first MBSSID set comprising a first virtual AP belonging to a first AP MLD of the plurality of AP MLDs;

determine a second MBSSID set on a second link of the AP, the second MBSSID set comprising a second virtual AP belonging to a second AP MLD, the second AP MLD being different from the first AP MLD, and the first MBSSID set and the second MBSSID set having virtual APs belonging to a same AP MLD;

determine the first virtual AP as a transmitted virtual AP of the first MBSSID set;

determine the second virtual AP as a transmitted virtual AP of the second MBSSID set;

generate a first beacon fragment and a second beacon fragment based on a first beacon information of the first virtual AP;

generate a third beacon fragment and a fourth beacon fragment based on a second beacon information of the second virtual AP, the third beacon fragment corresponding to the first beacon fragment, the fourth beacon frame corresponding to the second beacon frame; and in response to transmitting the first beacon fragment by the first virtual AP, transmit the fourth beacon fragment by the second virtual AP.

12. The AP of claim 11, wherein the memory further stores instructions to cause the at least one processor to:

determine a first virtual AP number of virtual APs in the first MBSSID set; and in response to the first virtual AP number being greater than a first threshold, perform operations for adjusting an AP configuration.

13. The AP of claim 12, wherein the memory further stores instructions to cause the at least one processor to:

determine a second virtual AP number of virtual APs belonging to the first AP MLD; and in response to the second virtual AP number being greater than a second threshold, perform the operations for adjusting the AP configuration.

14. The AP of claim 13, wherein the memory further stores instructions to cause the at least one processor to:

determine a third virtual AP number of virtual APs belonging to the first AP MLD and the first MBSSID set; and in response to the third virtual AP number being greater than a third threshold, perform the operations for adjusting the AP configuration.

15. The AP of claim 14, wherein the memory further stores instructions to cause the at least one processor to:

determine a number of beacon frames transmitted by a virtual AP within a target beacon transmission time (TBTT);

determine a number of transmitted virtual APs on a radio of the AP;

determine a maximum number of virtual APs on the radio of the AP; and in response to the number of beacon frames, the number of transmitted virtual APs and the maximum number satisfy a predefined condition, perform the operations for adjusting the AP configuration.

16. The AP of claim 15, wherein the predefined condition is the beacon frame number times the transmitted virtual AP number being greater than the maximum number.

17. The AP of claim 15, wherein the instructions to determine the number of beacon frames transmitted by the virtual AP within the TBTT comprises instructions to:

determine a first duration used for transmitting a beacon frame;

determine a second duration used for transmitting a fast initial link setup (FILS) frame; and determine the number of beacon frames transmitted by the virtual AP within the TBTT based on the first duration and the second duration.

18. A non-transitory computer-readable medium comprising instructions stored thereon which, when executed by an access point (AP), cause the AP to:

determine a first multiple basic service set identifier (MBSSID) set on a first link of an access point (AP), the AP comprising a plurality of AP multiple-link devices (MLDs), and the first MBSSID set comprising a first virtual AP belonging to a first AP MLD of the plurality of AP MLDs;

determine a second MBSSID set on a second link of the AP, the second MBSSID set comprising a second virtual AP belonging to a second AP MLD, the second AP MLD being different from the first AP MLD, and the first MBSSID set and the second MBSSID set having virtual APs belonging to a same AP MLD;

determine the first virtual AP as a transmitted virtual AP of the first MBSSID set;

determine the second virtual AP as a transmitted virtual AP of the second MBSSID set;

generate a first beacon fragment and a second beacon fragment based on a first beacon information of the first virtual AP;

generate a third beacon fragment and a fourth beacon fragment based on a second beacon information of the second virtual AP, the third beacon fragment corresponding to the first beacon fragment, the fourth beacon frame corresponding to the second beacon frame; and in response to transmitting the first beacon fragment by the first virtual AP, transmit the fourth beacon fragment by the second virtual AP.

* * * * *